April 16, 1968 P. M. BOOCOCK ET AL 3,378,283

TUBE JOINTS

Filed Nov. 9, 1964 2 Sheets-Sheet 1

United States Patent Office 3,378,283
Patented Apr. 16, 1968

3,378,283
TUBE JOINTS
Peter Munro Boocock, Warrington, and George Angus Milne, Altrincham, England, assignors to United Kingdom Atomic Energy Authority, London, England
Filed Nov. 9, 1964, Ser. No. 409,875
Claims priority, application Great Britain, Nov. 20, 1963, 45,790/63
6 Claims. (Cl. 285—187)

ABSTRACT OF THE DISCLOSURE

A tube joint in which an end of an externally flanged tube is disposed within an end of an internally flanged tube and the flanges are sealingly thrust together by bolts supported from one of the tubes with resilient struts interposed between the bolts and the flanges.

---

This invention relates to tube joints and is concerned with joints between tubes of different diameters and having different coefficients of thermal expansion.

One construction of joint for joining such tubes is disclosed in British Patent No. 943,130 but it has been found that under thermal cycling conditions (within the range 150°–282° C. at a pressure of 935 p.s.i.g., for example) when the joint is subjected to variable bending moments, the bolt load is relaxed resulting in leakage from the joint. The bolt load relaxation is believed to be due to yield of the thermal compensating ring used in the construction and to yield and creep of the zirconium alloy flange of the smaller tube.

According to the present invention, a tube joint between a larger tube and a smaller tube having different coefficients of thermal expansion, comprises an internal flange on the larger tube, an external flange on the smaller tube within the larger tube, a gasket between the flanges, and means for applying a clamping thrust to the flanges, said means including a thrust reaction member mounted on one of the tubes and a series of thermal expansion compensating struts acting between said thrust reaction member and the flange of the other of the tubes.

When the joint is in use in a hot environment the differential in linear thermal expansion between the tubes is compensated by the expansion of the struts and, furthermore, relaxation of bolt load due to yield and creep of the flanges is compensated by the inherent resilience of the struts.

Preferably, the thrust reaction member supports an annular series of spaced bolts, said struts being interposed between the bolts and the flange of said other of the tubes. The struts may be integral with the bolts.

The means for applying a clamping thrust to the flanges may include a thrust ring interposed between the flange of said other of the tubes and the struts.

Figure 1:
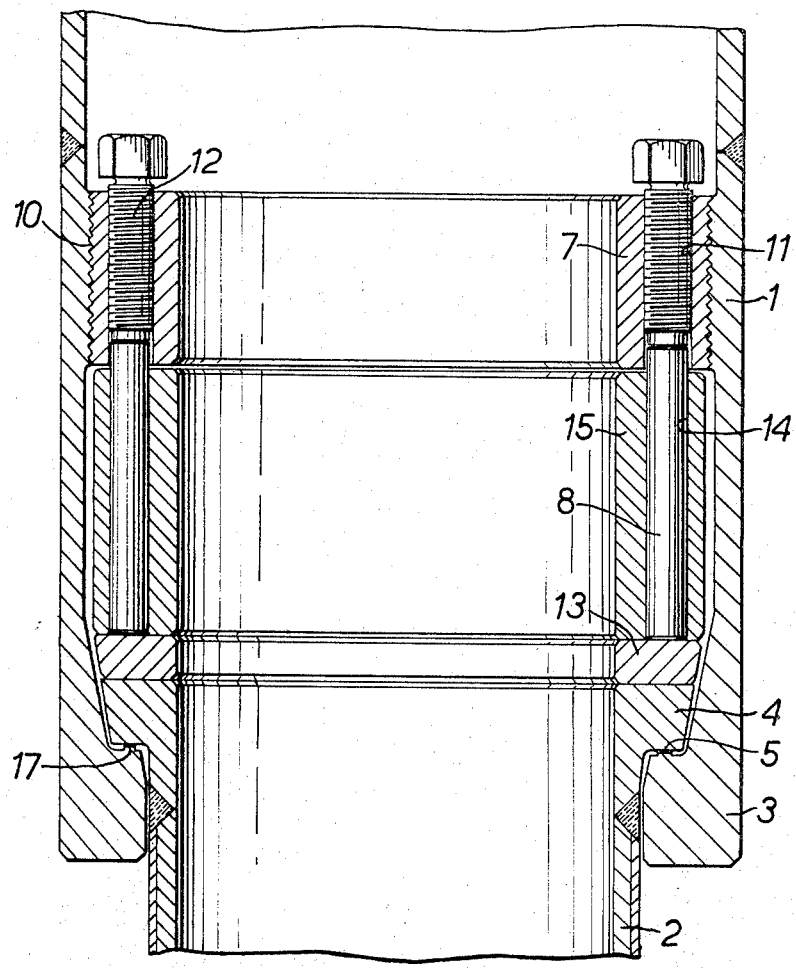
Figure 2:
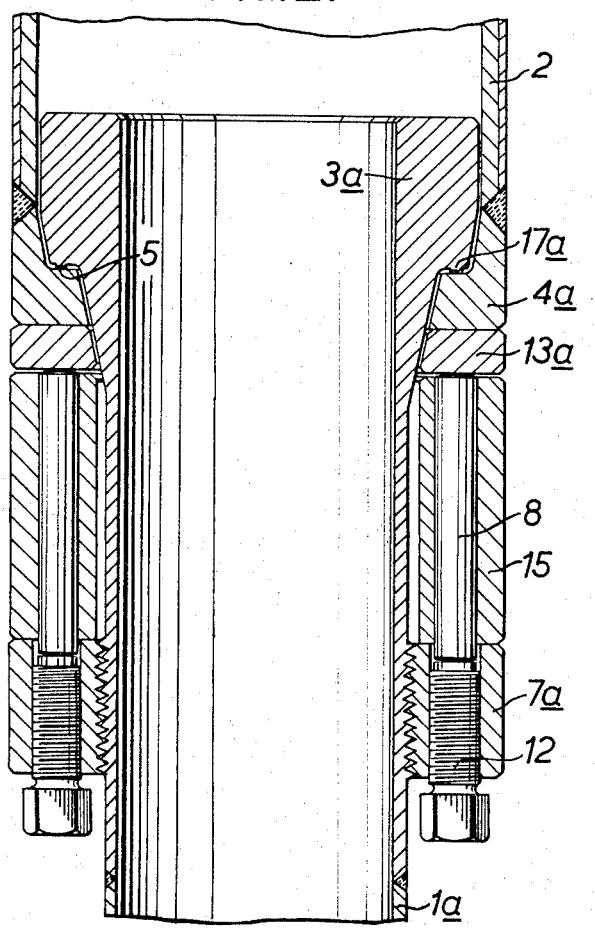

Two embodiments of the invention will now be described, by way of example, with reference to the accompanying drawings wherein:

FIGURES 1 and 2 are fragmentary side views in medial section of the two embodiments.

Referring to FIGURE 1, a tube joint between a larger tube 1 of stainless iron (of the type designated F.V. 405 and made in U.K. by Firth Vickers Ltd.) and a smaller tube 2 of zirconium alloy (Zircaloy-2) comprises an internal flange 3 on the tube 1, an external flange 4 on the tube 2, received within the tube 1, and a soft metal (gold) gasket 5 between the flanges 3, 4. The flanges are clamped together by means of an annular series of eighteen set bolts 12 supported by an annular member 7 mounted on the tube 1 the set bolts being used to apply a clamping thrust to the flanges 3, 4, through a corresponding series of struts 8 and a thrust ring 13. A guide member 15 has an annular series of holes 14 slidably penetrated by the struts 8 serving to hold these struts in spaced relationship corresponding to the spaced relationship of the set bolts 12 and with their longitudinal axes parallel with the axes of the tubes. The annular member 10 is secured to the tube 1 by a screw thread connection 9 and the set bolts 12 engage screw threads 11 in the annular member 10. The struts 8 have convex ends whilst the ends of the set bolts which abut the struts are flat.

An upper face of the flange 3 carries a spigot 17 and the gasket 5 is located between the spigot 17 and the adjacent face of the flange 4. In the presently described construction adjacent faces of the spigot and flange are machined to form spiral "gramophone" grooves but in an alternative construction the spigot 17 and flange 4 are machined to form concentric grooves.

The tube joint is made by tightening the set bolts 12 so that the gasket 5 is deformed between the grooved faces of the spigot 17 and the flange 4. The thrust ring 13, guide member 15 and member 7 are made of stainless iron of the aforesaid designation F.V. 405 and the struts 8 and set bolts 12 are made of stainless iron of designation F.V. 520 which has a higher coefficient of linear thermal expansion than that of F.V. 405.

When the tubes 1, 2 are conducting fluids (for example water or water and steam mixture) at elevated temperatures (for example 600° C.), the tubes expand at different rates. The linear expansion of the tube 1 is greater than that of the tube 2 but is compensated by the linear expansion of the struts 12 which is greater than the tube 1. Relaxation of the bolt load due to creep of the Zircaloy flange 4 is accommodated by the resilience of the struts 8.

The thrust ring 13 serves to present a hard surface to the ends of the struts thereby reducing the effect of bolt load relaxation due to indentation of the relatively soft surface of the Zircaloy flange 4. The convex ends of the struts 8 enable point contact of the struts with the thrust ring 13 and set bolts 12 so that thrust on the ring is maintained substantially perpendicular to the annular sealing faces of the flanges.

In the embodiment shown in FIGURE 2, the annular member 7a struts 8, set bolts 12, thrust ring 13a and guide member 15 are disposed about and outside the tube 1a. The tubes 2 and 1a are of Zircaloy and stainless iron (of the aforesaid designation F.V. 405) respectively.

The tube joints of the described embodiments are used in the construction of pressure tubes for use in a nuclear reactor of the type wherein fuel members are housed in liquid coolant conducting tubes (termed pressure tubes) extending through the core. The pressure tubes comprise two end tubes 1, 1a of stainless iron joined to an intermediate tube 2 of Zircaloy by the constructional embodiments described.

In an alternative construction of tube joint the struts 8 are formed as integral extensions of the bolts 12.

Further details of the tubes and tube joints are as follows:

| | Inches |
|---|---|
| Tube 1: | |
|    O.D. | 8.0 |
|    I.D. | 7.375 |
|       Depth of flange 3 | 1.25 |
| Tube 2: | |
|    O.D. | 5.74 |
|    I.D. | 5.14 |
|       Depth of flange 4 | 0.75 |
|       Depth of flange 4a | 0.68 |
| Tube 1a: | |
|    O.D. | 3.5 |
|    I.D. | 3.212 |
|       Depth of flange 3a | 1.75 |

Struts 8:                                              Inches
    Diameter _____ 0.048
    Length _____ 3.375
    End radius _____ 3.0
Member 7, depth _____ 2.0
Member 7a, depth _____ 1.5
Thrust ring 13, depth _____ 0.5
Guide member 15, depth _____ 3.0625
Set bolts 12, diameter _____ 0.5625

Coefficients of linear thermal expansion of the materials:

Stainless iron (F.V. 405) _____ $11.25 \times 10^{-6}/°C$.
Stainless iron (F.V. 520) _____ $12.10 \times 10^{-6}/°C$.
Zircaloy-2 _____ $5.50 \times 10^{-6}/°C$.

We claim:

1. A tube joint comprising a first tube having an internal annular flange, a second tube having an external annular flange disposed within said first tube, said first and second tubes being of different materials having different coefficients of linear thermal expansion, a gasket between opposed sealing faces of said flanges, said flanges sealingly engaging said gasket means mounted on one of said tubes for applying clamping thrust to said flanges, thereby maintaining said flanges in sealing engagement with said gasket, said means including an annular series of spaced bolts and mounting means therefor, and a series of thermal expansion compensating struts, said struts and bolts each having a coefficient of linear thermal expansion greater than that of either said first or second tubes, said struts being disposed between said bolts and the flange of the other one of said first and second tubes.

2. A tube joint according to claim 1, wherein said means for applying clamping thrust to said flanges is mounted on and within said first tube.

3. A tube joint according to claim 1, wherein said means for applying clamping thrust to said flanges is mounted on and outside said second tube.

4. A tube joint according to claim 1, including a guide member for retaining the struts in spaced axial relationship and parallel to the tube axes.

5. A tube joint according to claim 1, wherein said annular series of spaced bolts and said series of thermal expansion compensating struts are integral, each strut forming an extension to one of said bolts.

6. A tube joint comprising a first tube having an internal annular flange, a second tube having an external annular flange disposed within said first tube, one of said tubes being of ferrous alloy and the other of said tubes being of zirconium alloy, a gasket between opposed sealing faces of said flanges, said flanges sealingly engaging said gasket, means mounted on said ferrous alloy tube for applying a clamping thrust to said flanges, thereby maintaining said flanges in sealing engagement with said gasket, said means including an annular series of spaced bolts and mounting means therefor, an annular series of spaced thermal expansion compensating struts, said struts and bolts each having a coefficient of linear thermal expansion greater than that of either said first or second tubes, a thrust ring having a coefficient of linear thermal expansion equal to that of said ferrous alloy tube, said thrust ring being disposed adjacent the flange of said zirconium alloy tube and said struts being interposed between the bolts and the thrust ring, and a guide member for supporting said struts in spaced relationship.

References Cited

UNITED STATES PATENTS 3,093,398    6/1963    Fawcett et al. _____ 285—187 X
3,135,536    6/1964    Chilton _____ 285—187
3,148,902    9/1964    Gardner et al. _____ 285—374 X

FOREIGN PATENTS 718,625    11/1954    Great Britain.

CARL W. TOMLIN, *Primary Examiner.*

D. W. AROLA, *Assistant Examiner.*